United States Patent [19]

Vasiliev et al.

[11] Patent Number: 5,814,386

[45] Date of Patent: Sep. 29, 1998

[54] COMPOSITE SHELL FORMED AS A BODY OF ROTATION, AND METHOD AND MANDREL FOR MAKING SAME

[75] Inventors: Valery Vitalievich Vasiliev; Vladimir Alexandrovich Bunakov, both of Moscow; Alexandr Fredeorovich Razin; Mikhail Sergeevich Artjukhov, both of Moskovskaya, all of Russian Federation

[73] Assignees: McDonnell Douglas Corporation, Huntington Beach, Calif.; Crismb-Cat, Moscow, Russian Federation

[21] Appl. No.: 756,230

[22] Filed: Nov. 25, 1996

[30] Foreign Application Priority Data

Dec. 1, 1995 [RU] Russian Federation ............. 95120432

[51] Int. Cl.$^6$ ....................................................... B32B 1/08
[52] U.S. Cl. ......................... 428/36.3; 156/169; 156/170; 156/172; 156/173; 156/180; 428/36.8; 428/36.91
[58] Field of Search ................................. 428/36.3, 36.8, 428/36.91; 156/169, 170, 172, 173, 180

[56] References Cited

U.S. PATENT DOCUMENTS

| 3,083,864 | 4/1963 | Young. |
| 4,137,354 | 1/1979 | Mayes, Jr.. |
| 4,278,485 | 7/1981 | Hamm. |
| 4,284,679 | 8/1981 | Blad. |

*Primary Examiner*—James S. Bell
*Attorney, Agent, or Firm*—Bell Seltzer Intellectual Property Law Group of Alston & Bird LLP

[57] ABSTRACT

The inventions relate to the field of machine manufacturing and more specifically, to shell-type construction of base members used in aviation engineering and rocketry, which operate under conditions of combined stressed state, to the methods of and mandrels for their manufacture.

A load-carrying tube-shell comprises a cellular framework 1 made of spiral and annular strips 4, 5 crossing each other to define layers 3 of systems repeated over the thickness of the wall thereof so that stiffening ribs 6, 7 with criss-crosses 8, 9, 10 are thus formed, and outer coating layers 2 respectively made of unidirectional filaments 11 bound by a cured polymeric binder 12. Damping-absorbing layers 14 of resilient-elastic material such as rubber or polyurethane are disposed between the layers 3.

A method of the manufacture of the tube-shell comprises a step of introducing intermediate continuous forming strips 20 placed beneath the layers 4, 5 laid down under tension.

The disclosed mandrel comprises intermediate forming strips 20 of resilient-elastic material doubled with the strips 4, 5 disposed in mutually crossing slots 17, 18, 19.

6 Claims, 4 Drawing Sheets

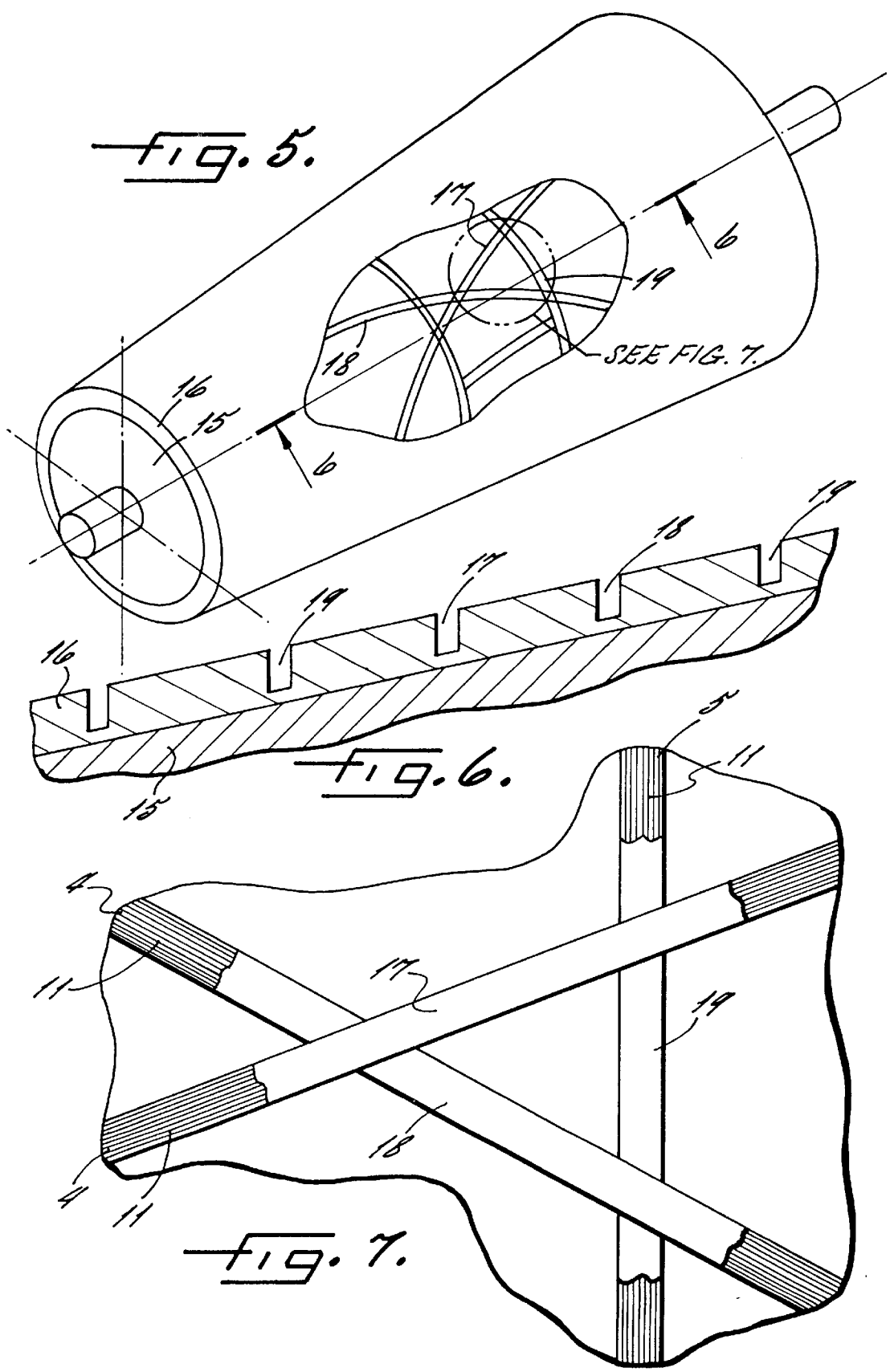

COMPOSITE SHELL FORMED AS A BODY OF ROTATION, AND METHOD AND MANDREL FOR MAKING SAME

The inventions relate to the field of machine manufacturing and more specifically, to shell-type constructions of base members used in aviation engineering and rocketry, which operate under conditions of combined stressed state, to the methods of and mandrels for their manufacture.

A tube-shell is known in prior art to be made in the form of a body of revolution from composite materials and comprise a skin and a supporting framework of cellular structure formed by spiral and annular strips crossing each other.

(U.S. Pat. No. 3,083,864, U.S.Cl. 220-83, publ. 1963), incorporated herein by reference, A tube-shell is also known in prior art to be made in the form of a body of revolution from composite materials and comprise a supporting framework of cellular structure formed by unidirectional cross filaments, and outer coating layers.

(U.S. Pat. No. 4,137,354, U.S.Cl. 428-118, publ. 1979), incorporated herein by reference, The tube-shells of prior art knowledge have disadvantages consisting in their reduced rigidity and strength caused by a local loss of stability, as well as increased stress concentration between the layers of reinforcing material in the stiffening ribs because of the lack of solidity and continuity of cured polymeric materials. Such tube-shells, in order to ensure reliability under conditions of combined stressed state with simultaneous loading for compression, bending and torsion, require additional reinforcement and possess a rather high mass.

The closest prior art, as far as the technical concept is concerned, is constituted by a tube-shell in the form of a body of rotation made of composite materials and comprising a supporting framework of cellular structure formed by spiral and annular strips crossing each other to define systems repeated over the thickness of the framework wall, said strips forming stiffening ribs with criss-crosses, with outer coating layers made respectively of unidirectional filaments bound by a cured polymeric binder.

(U.S. Pat. No. 4,284,679, U.S. Cl. 428-218, publ. 1978), incorporated herein by reference, The above-mentioned load-carrying tube has been selected as the closest prior art, it possesses similar disadvantages and has low resistance to powerful acoustic influence.

A method is known in prior art to be used for the manufacture of a tube-shell of cellular structure made of composite materials, said method comprising spiral-crossing and annular winding of unidirectional filaments impregnated with a binder.

(U.S. Pat. No. 3,083,864, U.S. Cl. 220-83, publ. 1963), incorporated herein by reference, A method is known in prior art to be used for the manufacture of tube-shells of layer structure made of composite materials, said method comprising the steps of putting forming elements of rubber-like material on a mandrel and forming a network of mutually crossing slots therebetween, laying unidirectional crossing filaments impregnated with a binder down into the slots to form stiffening ribs, winding strips while tensioning them over the forming members and filaments in the slots to form outer coating layers, and heat-treating thereof followed by removing the mandrel and the forming elements.

(U.S. Pat. No. 4,137,354, U.S. Cl. 428-116, publ. 1979), incorporated herein by reference, The methods of prior art knowledge used for the manufacture of tube-shells of cellular structure fail to ensure the required quality of forming their framework and solidity of the stiffening ribs, and this leads to a loss of stability.

The method according to U.S. Pat. No. 4,137,354, incorporated herein by reference, is technologically complicated because of a plurality of steps related to putting on and taking off a large number of forming elements.

The closest prior art to this invention, as far as the technical concept thereof is concerned, is constituted by a method of the manufacture of a tube-shell, comprising the steps of coating a core with a rubber-like material having mutually crossing slots, laying spiral and annular crossing strips of unidirectional filaments impregnated with a polymeric binder down into the slots to form a framework of cellular structure, applying forming elements thereto, and heat-treating thereof followed by removing the core and the rubber-like coating.

(U.S. Pat. No. 4,284,679, U.S. Cl. 428-218, publ. 1978), incorporated herein by reference, This method as the closest prior art has been selected as the most relevant prior art knowledge. The disadvantages of this method should include irregular compaction of the stiffening ribs by the forming elements—a factor which impairs the quality of the finished product.

A mandrel is known in prior art to be used for the manufacture of tube-shells of cellular structure made of composite materials and comprising a framwork with forming elements of rubber-like material with a network of mutually crossing slots therebetween for laying down therein unidirectional crossing filaments impregnated with a binder to form stiffening ribs.

(U.S. Pat. No. 4,137,354, U.S. Cl. 428-116, publ. 1979), incorporated herein by reference, The disadvantages of this mandrel of prior art knowledge consist in its complexity, high labour content of manufacturing and too much time needed to assemble and disassemble it.

The closest prior art, as far as the technical concept is concerned, is constituted by a mandrel according to U.S. Pat. No. 4,284,679, U.S. Cl. 428-116, publ. 1978 incorporated herein by reference, that is designed for the manufacture of tube-shells of cellular structure made of composite materials, comprising a core and a rubber-like material coating the core and having mutually crossing slots for laying down therein spiral and annular crossing strips of unidirectional filaments to form stiffening ribs of a tube-shell framework, said mandrel possessing the same disadvantages. This mandrel has been selected as the most relevant prior art knowledge.

The main problem at the solution of which the inventions now claimed are aimed is the development of such a construction of a load-carrying tube-shell in the form of a body of revolution made of composite materials, a method of and a mandrel for its manufacture which would ensure its reliable operation under conditions of combined stressed state with simultaneous action of compression and bending loads, improved resistance to powerful acoustic influence, would withstand sound pressure having an intensity of 150 to 170 decibels with a frequency spectrum of 30 to $10^4$ Hertz, and would possess improved resistance to such influence.

The technical result which can be attained by implementing these inventions, the object thereof, is to improve strength, rigidity and reliability of the load-carrying tube-shell.

The problem thus stated has been solved and the above technical result reached owing to a change in the structure of the supporting framework of the load-carrying tube-shell, intermediate forming elements introduced in the method simultaneously with laying down spiral and annular crossing strips, and to an appropriate change in the construction of the rubber-like material that is used for coating the core.

Within this aim in view, in a load-carrying tube-shell in the form of a body of revolution made of composite materials and comprising a supporting framework of cellular structure formed by spiral and annular strips crossing each other to define layers of systems repeated over the thickness of the framework wall, said strips forming stiffening ribs with criss-crosses, with outer coating layers made respectively of unidirectional filaments bound by a polymeric binder, its supporting framework is provided with damping-absorbing layers of resilient-elastic material having a high sound wave damping decrement such as, for instance, rubber or polyurethane, said damping-absorbing layers being disposed between the layers of said systems defined by the spiral and annular strips crossing each other in the framework and forming the stiffening ribs thereof, said damping-absorbing layers being doubled with the stiffening ribs, including also the transitional ribs between the annular ribs, over the width thereof and congruent thereto, with the filaments of the outer coating layers being disposed at an angle of 80° to 90° with respect to the axis of symmetry of the shell.

In the method of the manufacture of a tube-shell, comprising the steps of coating a core with a rubber-like material having mutually crossing slots, laying spiral and annular crossing strips of unidirectional filaments impregnated with a polymeric binder down into the slots to form a framework of cellular structure, applying forming elements thereto, and heat-treating thereof followed by removing the core and the rubber-like coating, intermediate forming elements in the form of continuous strips of resilient-elastic material such as rubber or polyurethane, are introduced between the layers of systems defined by the spiral and annular crossing strips when laying them down along predetermined directions, said continuous strips being placed beneath the strips of unidirectional filaments thus laid down, with outer forming elements applied thereto for setting thereof, said outer forming elements being made in the form of filaments disposed at an angle of 80° to 90° with respect to the axis of symmetry of the core.

In the mandrel for the manufacture of a tube-shell, comprising a core and a rubber-like material coating the core and having mutually crossing slots for laying down therein spiral and annular crossing strips of unidirectional filaments to form stiffening ribs of a tube-shell framework, the rubber-like material coating the core comprises the spiral and annular crossing strips with transitional stretches between the annular strips disposed in the slots thereof and doubled with intermediate forming continuous strips of resilient-elastic material such as rubber or polyurethane.

The distinguishing features of the load-carrying tube-shell are as follows:

provide its supporting framework with damping-absorbing layers, of resilient-elastic material having a high sound wave damping decrement such as, for instance, rubber or polyurethane, the damping-absorbing layers being disposed between the layers of the systems defined by the spiral and annular strips crossing each other and forming the ribs of the framework, the damping-absorbing layers being doubled with the stiffening ribs over the width thereof, including also the transitional stiffening ribs between the annular ribs, and the filaments of the outer coating layers being disposed at an angle of 80° to 90° with respect to the axis of symmetry of the shell.

The distinguishing features of the method of the manufacture of a tube-shell are as follows:

introducing of intermediate forming elements, in the form of continuous strips of resilient-elastic material such as rubber or polyurethane, between the layers of systems defined by the spiral and annular crossing strips when laying them down along predetermined directions, the continuous strips being placed beneath the strips of unidirectional filaments, and outer forming elements applied thereto for setting thereof, the outer forming elements being made in the form of filaments disposed at an angle of 80° to 90° with respect to the axis of symmetry of the core.

The distinguishing features of the mandrel for the manufacture of a tube-shell are as follows:

providing the rubber-like material coating the core with intermediate forming elements, in the form of continuous strips of resilient-elastic material such as rubber or polyurethane, doubled with layers of systems defined by the spiral and annular crossing strips of unidirectional filaments, and disposed in mutually crossing slots and in transitional stretches between the annular slots.

The above-mentioned distinguishing features of the load-carrying tube-shell, the method of and the mandrel for the manufacture thereof are essential features, since each of them taken separately and in combination with all the other features is aimed at attaining the solutions for the problem thus posed and at reaching the above-mentioned technical result, while elimination of any one of them will not allow to solve the problem posed.

For instance, if no damping-absorbing layers are provided between the layers of the supporting framework of the tube-shell and no intermediate forming elements are introduced in laying down the strips in the method of and the mandrel for the manufacture thereof, the problem posed cannot be solved and the new technical result cannot be reached.

No use of the essential distinguishing features discussed above has been found in the tubes, methods of and in the mandrels for the manufacture thereof in the known state of the art or in the closest or most relevant prior art teachings, and this is indicative of their novelty and allows to characterize the disclosed technical solutions as complying with the criterion of "Novelty".

The unified combination of the new essential features with the common ones of prior art knowledge in the load-carrying tube-shell, in the method of and in the mandrel for the manufacture thereof allows to solve the problem posed and to reach the new technical result, i.e., to ensure the possibility of production of large-size load-carrying tube-shells having a diameter of 2.5 meters, or more, and made of composite materials. This allows to characterize the disclosed technical solutions by essential distinctions over the known state of the art or over the closest and most relevant prior art teachings, these technical solutions result from research and experimental investigations and from creative contribution, they are developed without the use of standard guidance normative documents or any familiar procedure in this field of engineering, and all this is indicative of their compliance with the criterion of "Inventive height".

BRIEF DESCRIPTION OF THE DRAWINGS

The inventions will further be described in greater detail with reference to the accompanying drawings.

FIG. 5 shows a mandrel for the manufacture of the tube-shell;

FIG. 6 is a scaled-up axial sectional view of the mandrel;

FIG. 7 is a fragment of the rubber-like coating with a system of mutually crossing spiral and annular slots.

Figure 1:
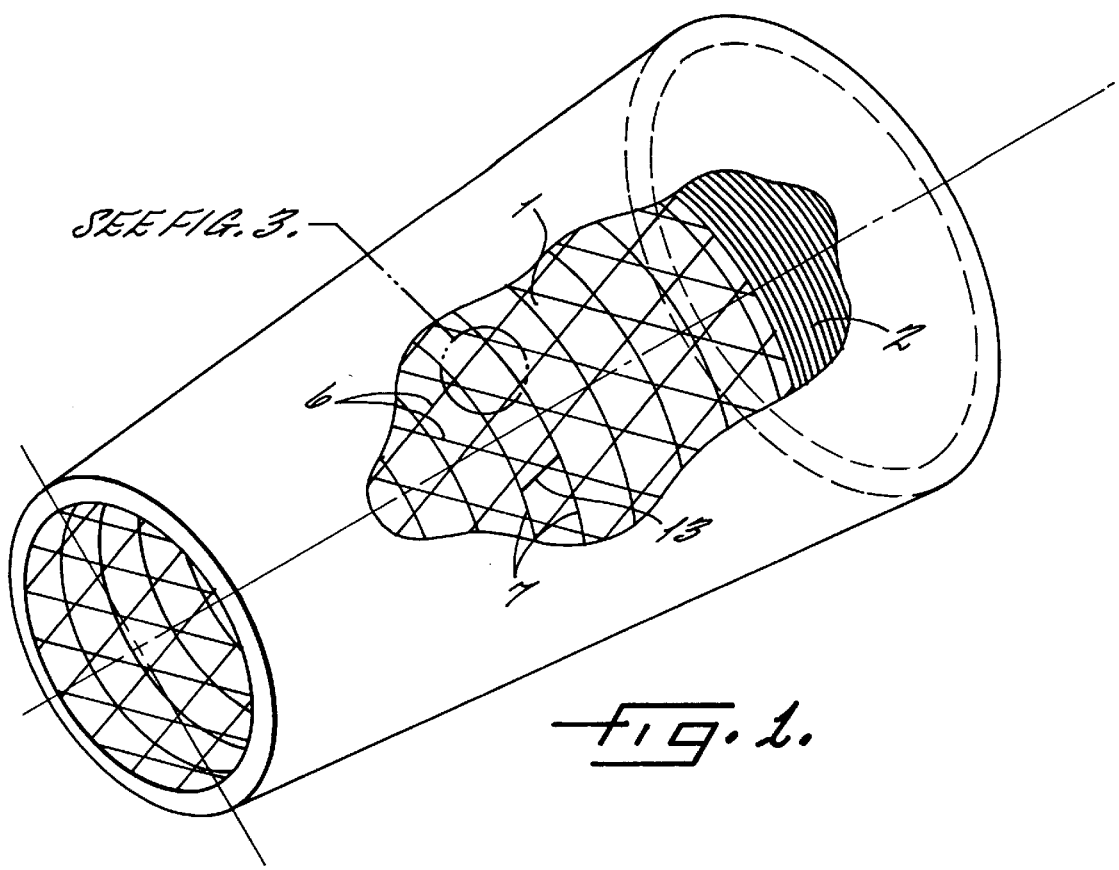
FIG. 1 is a general view of a load-carrying tube-shell in the form of a body of revolution made of composite materials.
Figure 2:
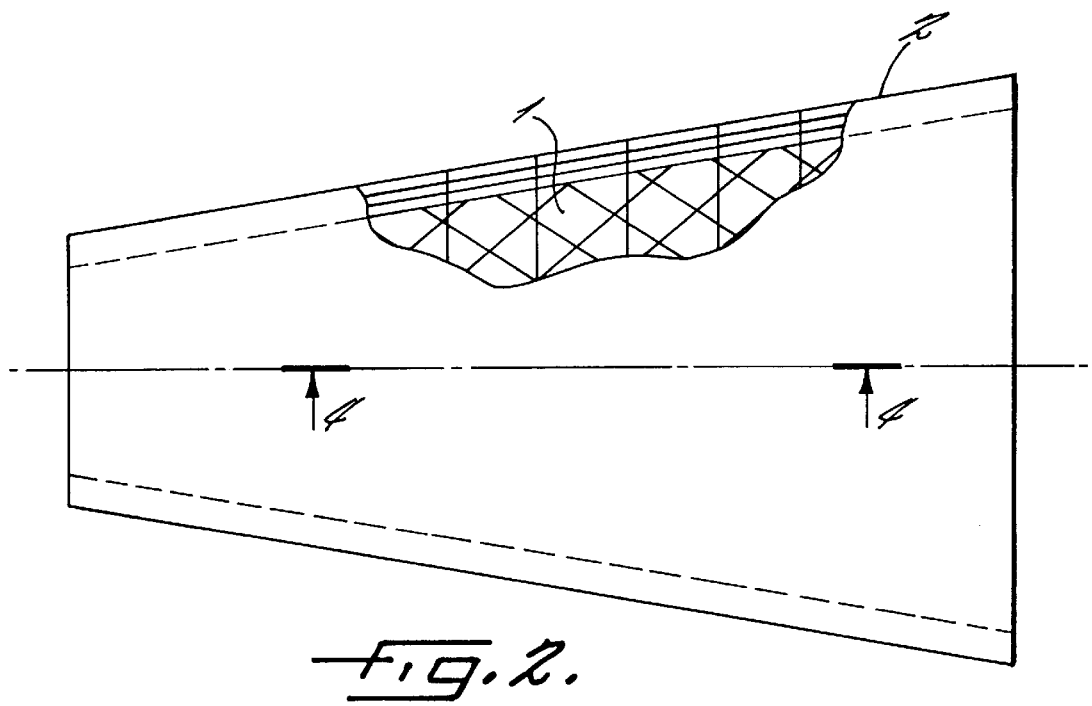
FIG. 2 is a side view of the tube-shell.
Figure 3:
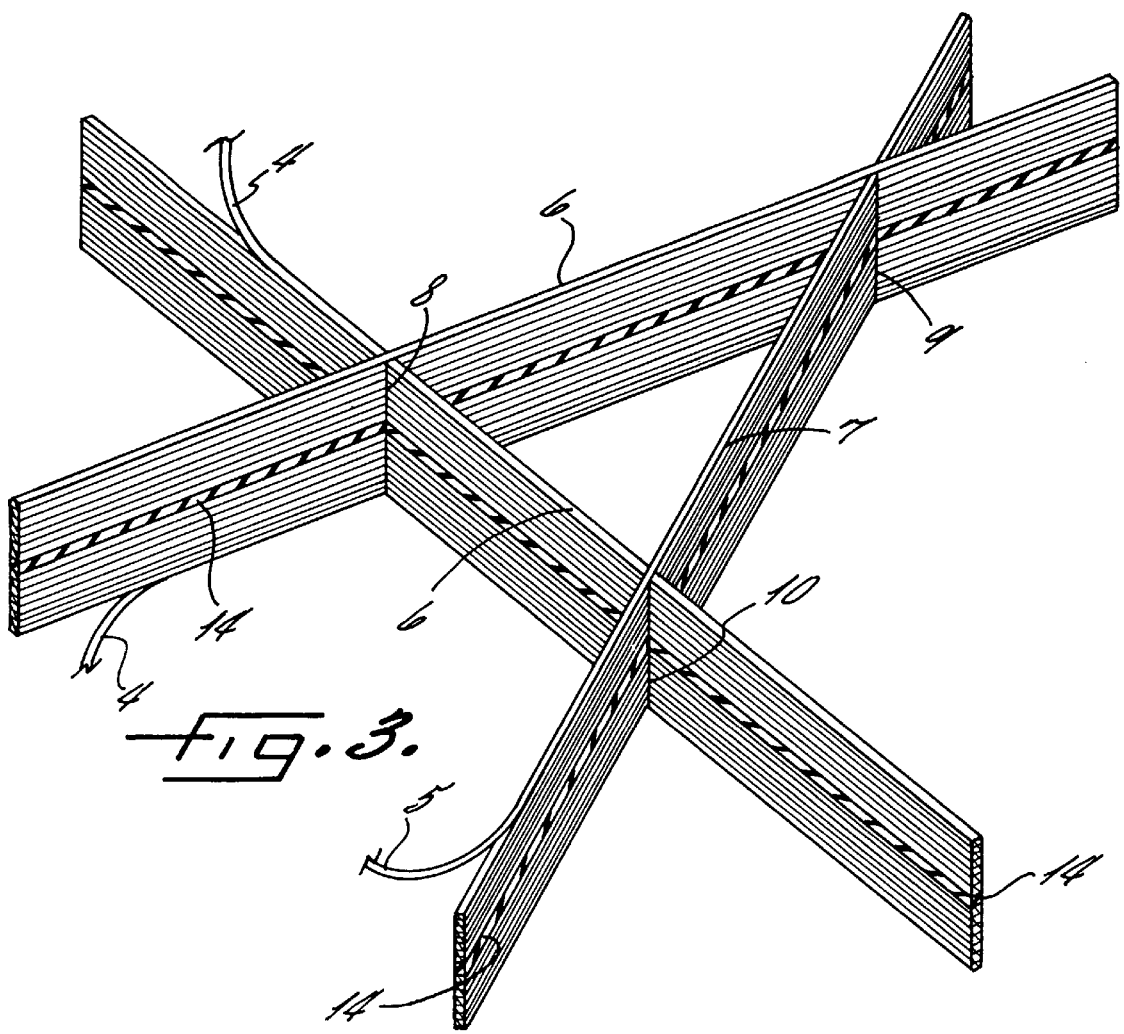
FIG. 3 is a typical structure of the layers of systems defined by spiral and annular strips crossing each other and forming the supporting framework of the tube-shell.
Figure 4:
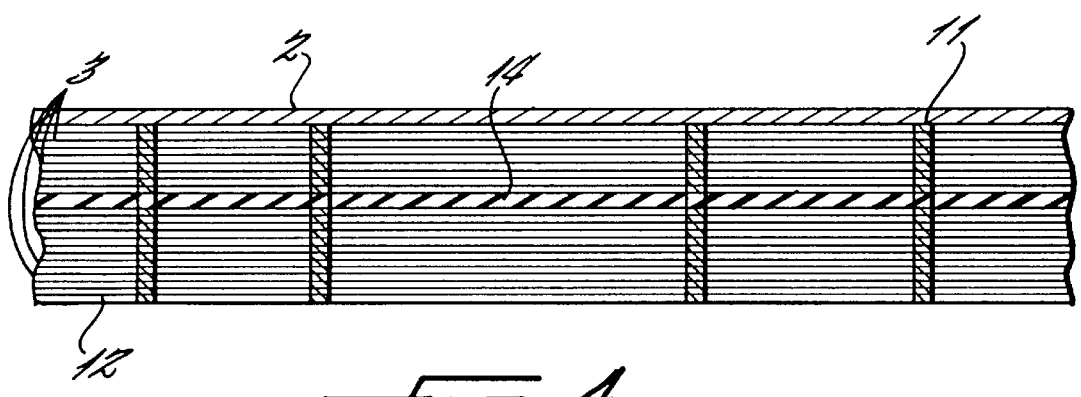
FIG. 4 is an axial sectional view of the tube-shell, illustrating the way how the damping-absorbing elements are disposed in the ribs.
Figure 8:
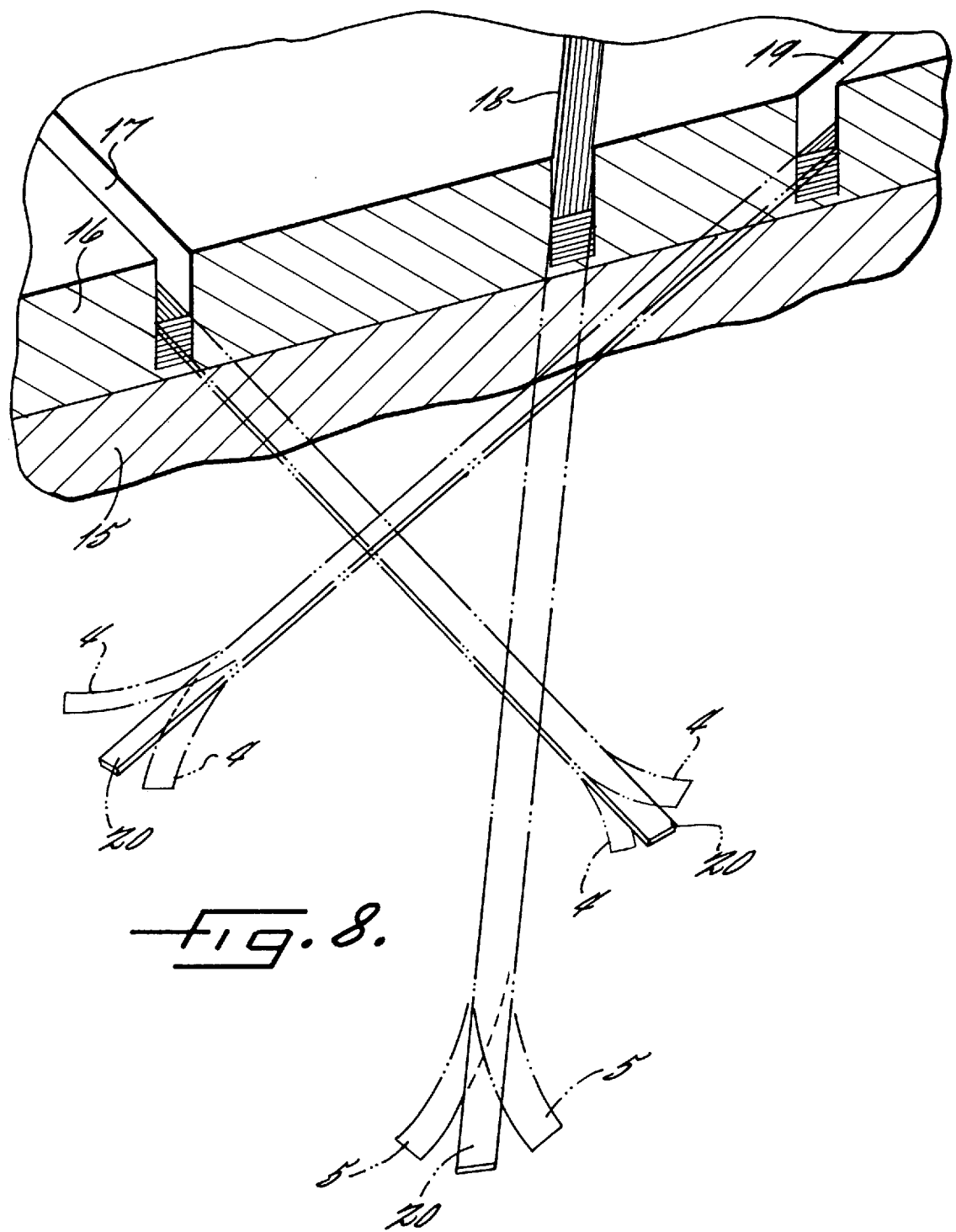
FIG. 8 is a typical diagram showing how the intermediate forming strips of resilient-elastic material are disposed in the coating material of the core.

A load-carrying tube-shell is made in the form of a body of rotation from composite materials and comprises a supporting framework 1 of cellular structure and outer coating layers 2 (FIGS. 1 and 2). The supporting framework 1 is made of spiral and annular strips 4, 5 crossing each other to define layers 3 of systems repeated over the thickness of the framework wall, the strips 4, 5 forming stiffening ribs 6, 7 with criss-crosses 8, 9, 10. The spiral and annular strips 4, 5 and the outer coating layers 2 are made of unidirectional filaments 11 bound by a cured binder 12. The supporting framework 1 of cellular structure is provided with damping-absorbing layers 14 of resilient-elastic material having a high sound wave damping decrement such as rubber or polyurethane, the damping-absorbing layers 14 being disposed between the layers 3 of the systems defined by the spiral and annular strips 4, 5 crossing each other in the framework 1 and forming the stiffening ribs 6, 7 thereof with the criss-crosses 8, 9, 10, the damping-absorbing layers 14 being doubled with the stiffening ribs 6,7, including also transitional ribs 13 between the annular ribs 7, over the width thereof, with the filaments 11 of the outer coating layers 2 being disposed at an angle of 80° to 90° with respect to the axis of symmetry of the shell.

In the supporting framework 1 the criss-crosses 8, 9, 10 and the ribs 6, 7, 13 repeated throughout the entire length thereof form a rigid structure reinforced by the outer coating layers 2 to ensure, together with the framework, reliable operation of the tube-shell under conditions of combined stressed state. The damping-absorbing layers 14 arranged to be disposed between the layers 3 of the systems defined by the spiral and annular strips 4, 5 crossing each other and forming the stiffening ribs 6, 7 with the criss-crosses 8, 9, 10 enable the supporting framework 1 to take up efficiently various loads and ensure improved resistance of the tube-shell to powerful acoustic influence exerted by sound waves, due to their absorption and dissipation.

In order to ensure the production of the load-carrying tube-shell, the disclosed mandrel comprises a core 15 and a rubber-like material 16 coating it and having mutually crossing slots 17, 18, 19 for laying down therein the spiral and annular crossing strips 4, 5 of unidirectional filaments 11 to form the stiffening ribs 6, 7, 13 and the criss-crosses 8, 9, 10 of the supporting framework 1. The rubber-like material 16 coating the core 15 comprises the spiral and annular crossing strips 4, 5 and intermediate continuous forming strips 20 of resilient-elastic material such as rubber or polyurethane disposed in the slots 17, 18, 19 thereof and doubled with the reinforcing strips 4, 5 at their side surfaces so that their filaments 11 are firmly attached to the resilient-elastic material and to the adjacent layers 3 by the polymeric binder 12.

The load-carrying tube-shell in the form of a body of revolution made of composite materials is manufactured as follows.

Put on the core 15 and attached thereto to coat it is a flexible rubber-like material 16 make to have mutually crossing slots 17, 18, 19, then the core 15 is set in a winding machine (not shown) to lay the spiral and annular crossing strips 4, 5 of unidirectional filaments 11 impregnated with the polymeric binder 12 down into the slots 17, 18, 19, while intermediate continuous forming strips 20 of resilient-elastic material such as rubber or polyurethane are introduced between the layers 3 of the systems defined by the spiral and annular crossing strips 4, 5 with the transitional ribs 13 so that they are placed between the annular strips 5 and which, in the process of forming the subsequent layers 3, cut partially into the resilient-elastic material under the action of tightening forces on the strips 4, 5. The intermediate continuous forming strips 20 exert some additional pressing action upon the layers 3 of the systems defined by the spiral and annular crossing strips 4, 5 when they are subsequently applied thereto to fill up the mutually crossing slots 17, 18, 19 to their whole depth in the coating rubber-like material and when the unidirectional filaments 11 are wound around over the coating rubber-like material 16 to form the outer coating layer 2, thus creating external prepressing influence upon the layers 3. The mandrel with the blank thus produced is placed into a chamber in order to cure the polymeric binder 12 and simultaneously vulcanize the continuous forming strips 20 under the conditions of curing the polymeric binder 12. In doing so, wherever respectively the polymeric binder is applied thereto and the resilient-elastic material 20 is introduced, the unidirectional filaments get firmly attached to each other and to the above-mentioned layers.

After the blank is thus cured, the core 15 and the rubber-like material 16 coating it are removed, and the continuous forming strips 20 remain between the layers of the strips 4, 5 and between the layers 3 so that the damping-absorbing layer 14 of resilient-elastic material congruent thereto is formed thereof.

The load-carrying tube-shell in the form of a body of revolution made of composite materials and also various fragments thereof produced with the use of these novel technical solutions, as far as its construction, the method of and the mandrel for the manufacture thereof are concerned, have been subjected to tests under conditions of combined stressed state and powerful acoustic influence of sound waves for the purpose of defining if they comply with the technical requirements, or not. The results of these tests are positive. The full-scale specimen has been manufactured from carbon filaments UKN 5000 (GOST 28008-88) and polymeric binder EHD-MK (OST 3-4759-80). The strip width has been selected within the range of 4 to 10 mm, with the number of filaments being 4 to 6. The mass of the strip when impregnated, depending on its width, is 1.3 to 1.85 g (500 m long). The strip has been tensioned by applying a force of 6 to 9 kgf thereto. The manufacture of full-scale prototype specimens has confirmed the efficiency and reasonability of their industrial manufacturing.

Thus, the disclosed technical solutions aimed at creating a load-carrying tube-shell in the form of a body of revolution made of composite materials comply with the criterion of "industrial applicability", i.e., to the level of inventions, so that it is reasonable to ensure protection of exclusive rights for their creation and use by a patent.

We claim:

1. A load-carrying tube shell in the form of a body of revolution made of composite materials and comprising:

a supporting framework of spiral and annular stiffening ribs which intersect to define a cellular structure, the supporting framework further including transitional stiffening ribs extending between the annular stiffening ribs, the stiffening ribs being formed of a plurality of layers, each layer including spiral and annular strips crossing each other and transitional strips extending between adjacent annular strips, the layers being repeated over the thickness of the framework, the stiffening ribs further including damping-absorbing layers of resilient-elastic material having a high sound wave damping decrement interposed between adjacent layers of the spiral, annular, and transitional strips; and a substantially continuous outer layer covering the supporting framework, the outer layer being formed of unidirectional filaments bound by a cured polymeric binder, the filaments of the outer coating layers being disposed at an angle of 80° to 90° with respect to the axis of symmetry of the shell.

2. A method of the manufacture of a load-carrying tube-shell, comprising the steps of coating a core with a rubber-like material having mutually crossing slots, laying spiral and annular crossing strips of unidirectional filaments impregnated with a polymeric binder down into the slots to form a framework of cellular structure, applying forming elements thereto, and heat-treating thereof followed by removing the core and the rubber-like coating, characterized in that intermediate forming elements in the form of continuous strips of resilient-elastic material are introduced between the layers of systems defined by the spiral and annular crossing strips when laying them down along predetermined directions, said continuous strips being placed beneath the strips of unidirectional filaments thus laid down, and further including the step of covering the framework with outer forming elements made in the form of filaments disposed at an angle of 80° to 90° with respect to the axis of symmetry of the core.

3. A mandrel for making a load-carrying tube-shell, comprising a core and a rubber-like material coating the core and having mutually crossing spiral and annular slots and transitional slots extending between adjacent annular slots, and further comprising spiral and annular crossing strips and transitional strips extending between the annular strips disposed in the spiral, annular and transitional slots, respectively, with intermediate continuous forming strips of resilient-elastic material doubled with the spiral and annular and transitional strips.

4. A tube-shell for connecting base members of a lying vehicle, comprising:

a supporting framework of said tube-shell, said supporting framework being of tubular configuration and cellular structure;

a first plurality of multilayer elements forming said supporting framework and arranged in spatial spirals having a common axis and the same direction;

a second plurality of multilayer elements forming said supporting framework and arranged in spatial spirals having a common axis essentially coinciding with said axis of said spatial spirals of said first plurality of multilayer elements, and the same direction opposite to said direction of said spatial spirals of said first plurality of multilayer elements;

a third plurality of multilayer elements of said supporting framework that are arranged in circumferences which have the centers thereof essentially laying on said axis of said spatial spirals of said first plurality of multilayer elements;

a multilayer element in said first, second and third pluralities of multilayer elements that is formed by a first set of strips, each strip of said first set of strips being made of a plurality of unidirectional filaments bound by a polymeric binder, and by a second set of strips, each strip of said second set of strips being made of a resilient-elastic material and disposed between said strips of said first set of strips;

an outer shell attached to said supporting framework of said tube-shell; and a fourth plurality of multilayer elements forming said outer shell and arranged in spatial spirals and having a helix angle lying in the range from about 1° to about 10° and made of a set of strips each of which if formed by a plurality of unidirectional filaments bound by a polymeric binder.

5. A method of the manufacture of a tube-shell for connecting base members of a flying vehicle, comprising the following steps:

(a) forming a mandrel by means of applying to a surface of a body having the form of a body of revolution a layer of rubber-like material having a first plurality of slots arranged in spatial spirals having a common axis and the same direction, a second plurality of slots arranged in spatial spirals having a common axis essentially coinciding with said axis of said spatial spirals of said first plurality of slots, and the same direction opposite to said direction of said spatial spirals of said first plurality of slots, and a third plurality of slots arranged in circumferences which have the centers thereof essentially lying on said axis of said spatial spirals of said first plurality of slots;

(b) forming a supporting framework blank of the tube-shell by means of filling up said first, second and third pluralities of slots by a plurality of multilayer elements formed by a first set of strips each strip of said first set of strips being therewith made of a plurality of unidirectional filaments and impregnated with a polymeric binder, and by a second set of strips, each strip of said second set of strips being therewith made of a resilient-elastic material and disposed between said strips of said first set of strips;

(c) forming a blank of said tube-shell by means of winding up under tension around said supporting framework blank a plurality of multilayer elements while arranging them in spatial spirals to have a helix angle lying in the range from about 1° to about 10°, wherein each of the multilayer elements of said plurality of multilayer elements is made of a set of strips each of which is formed by a plurality of unidirectional filaments and impregnated with a polymeric binder;

(d) forming the tube-shell by means of heat-treating said blank of said tube-shell in accordance with temperature conditions of polymerization of said polymeric binder with which said strips formed by a plurality of unidirectional filaments are impregnated;

removing said body out of said blank of said tube-shell; and removing said layer of rubber-like material out of said blank of said tube-shell.

6. A mandrel for the manufacture of a tube-shell for connecting base members of a flying vehicle, comprising:

a body;

a surface of said body having the form of a body of revolution;

a layer of rubber-like material applied to said surface of said body;

a first plurality of slots made in said layer of rubber-like material and arranged in spatial spirals having a common axis and the same direction;

a second plurality of slots made in said layer of rubber-like material and arranged in spatial spirals having a common axis essentially coinciding with said axis of said spatial spirals of said first plurality of slots and the same direction opposite to said direction of said spatial spirals of said first plurality of slots;

a third plurality of slots made in said layer of rubber-like material and arranged in circumferences which have the centers thereof essentially lying on said axis of said spatial spirals of said first plurality of slots;

a first plurality of multilayer elements laid down into said first plurality of slots;

a second plurality of multilayer elements laid down into said second plurality of slots;

a third plurality of multilayer elements laid down into said third plurality of slots; and a multilayer element in said first, second and third pluralities of multilayer elements that is formed by a first set of strips, each strip of said first set of strips being made of a plurality of unidirectional filaments bound by a polymeric binder, and by a second set of strips, each strip of said second set of strips being made of a resilient-elastic material and disposed between said strips of said first set of strips.

* * * * *

UNITED STATES PATENT AND TRADEMARK OFFICE
CERTIFICATE OF CORRECTION

PATENT NO. : 5,814,386
DATED : September 29, 1998
INVENTOR(S) : Vasiliev et al.

It is certified that error appears in the above-identified patent and that said Letters Patent is hereby corrected as shown below:

On the title page, item [75]
In the Inventors' names, line 3, "Fredeorovich" should read --Fedeorovich--.

Column 7, line 55, "lying" should read --flying--.

Column 8, line 6, "laying" should read --lying--; line 22, "if" should read --is--.

Signed and Sealed this

Fifth Day of January, 1999

Attest:

Attesting Officer

*Acting Commissioner of Patents and Trademarks*

UNITED STATES PATENT AND TRADEMARK OFFICE
CERTIFICATE OF CORRECTION

PATENT NO. : 5,814,386

DATED : September 29, 1998

INVENTOR(S) : Vasiliev et al.

It is certified that error appears in the above-identified patent and that said Letters Patent is hereby corrected as shown below:

Title page, item [73], second assignee, "Crismb-Cat" should read --Aktsionernoe Obschestvo Centr Perspektivnykh Razrabotok Aktsionernogo Obschestva Centralny Nauchno Issledovatelsky Institut Specialnogo Mashinostroenia--; and the address, "Moscow, Russian Federation" should read --Khutkovo, Moscow Region, Russia--.

Signed and Sealed this

Twenty-first Day of September, 1999

Attest:

Q. TODD DICKINSON

*Attesting Officer*    *Acting Commissioner of Patents and Trademarks*